United States Patent

Wu

[11] 3,923,842
[45] Dec. 2, 1975

[54] PREPARATION OF OXIRANE COMPOUND FROM THE CORRESPONDING OLEFIN VIA THE CYCLIC CARBONATE ESTER

[75] Inventor: Yulin Wu, Bartlesville, OK

[73] Assignee: Phillips Petroleum Company, Bartlesville, Okla.

[22] Filed: June 28, 1974

[21] Appl. No.: 484,262

[52] U.S. Cl............ 260/348 R; 260/340.2; 260/634
[51] Int. Cl.² ....................................... C07D 301/02
[58] Field of Search.................... 260/340.2, 348 R

[56] References Cited

UNITED STATES PATENTS

| 2,773,070 | 12/1956 | Lichtenwalter et al. | 260/340.2 |
| 2,773,881 | 12/1956 | Dunn | 260/340.2 |
| 3,535,341 | 10/1970 | Emmons et al. | 260/340.2 |

FOREIGN PATENTS OR APPLICATIONS

| 35,311 | 11/1970 | Japan | 260/340.2 |
| 1,272,932 | 7/1968 | Germany | 260/340.2 |
| 1,940,205 | 2/1971 | Germany | 260/348 R |

Primary Examiner—Norma S. Milestone

[57] ABSTRACT

Cyclic carbonate esters having 3 to 31 carbon atoms per molecule of the general formula

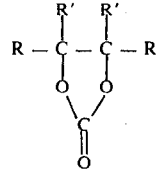

are prepared by reacting the corresponding vicinal halohydrin with carbon dioxide in the presence of an amine compound and are decomposed to produce oxirane compounds.

9 Claims, No Drawings

PREPARATION OF OXIRANE COMPOUND FROM THE CORRESPONDING OLEFIN VIA THE CYCLIC CARBONATE ESTER

This invention relates to the preparation of cyclic carbonate esters.

Cyclic carbonate esters of vicinal dialcohols are well known in the art. One method for making such esters involves the reaction of the corresponding halohydrin with sodium bicarbonate under pressure of carbon dioxide. This method produces water as a by-product which causes considerable loss of product by hydrolysis to the corresponding diol, from which it is difficult to separate the carbonate ester. Another method for preparing such cyclic carbonate esters involves the reaction of an alkali metal alkyl carbonate with a halohydrin to form the alkyl hydroxyalkyl carbonate, which undergoes internal ester exchange to form an alkylene carbonate.

It is an object of this invention to provide a novel process for the preparation of cyclic carbonate esters.

It is another object of this invention to provide an improved process for the preparation of cyclic carbonate esters from olefins.

Other objects, aspects and advantages of this invention will become apparent to those skilled in the art upon reading the specification and appended claims.

In accordance with this invention, it has been discovered that cyclic carbonate esters having from 3 to 31 carbon atoms per molecule of the general formula

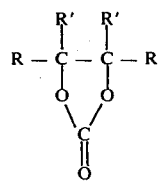

wherein each R and R' is individually selected from the group consisting of hydrogen and hydrocarbyl radical groups, as hereinafter defined, having from 1 to 10 carbon atoms, and wherein both R' radicals can represent a divalent aliphatic hydrocarbon radical which together with the carbon atoms to which the carbonate group is attached can form a cycloaliphatic ring, are prepared by reacting carbon dioxide with the corresponding vicinal halohydrin having from 2 to 30 carbon atoms per molecule of the general formula

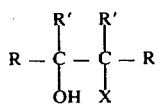

wherein R and R' are as defined above and X is chlorine, bromine or iodine, in the presence of an amine compound, as hereinafter defined, under reaction conditions. As used herein and in the claims, the term "hydrocarbyl" is intended to mean a member of the group consisting of alkyl, cycloalkyl, aryl, aralkyl and alkaryl radical groups.

The vicinal halohydrins from which the cyclic carbonate esters are prepared according to the process of the present invention are well known in the art. One useful method for the preparation of vicinal halohydrins is the reaction of a suitable olefin with oxygen in the presence of an iron halide and a copper halide. For example, a mixture of 1-chloro-2-propanol and 2-chloro-1-propanol is prepared by the reaction of propylene with oxygen in the presence of ferric chloride hexahydrate and cupric chloride or cuprous chloride, with ferric oxide as a coproduct of this reaction.

Examples of vicinal halohydrins suitable for use in the process of this invention include 2-chloroethanol, 1-chloro-2-propanol, 2-chloro-1-propanol, 2-chloro-1-octanol, 1-chloro-2-octanol, 2-chlorocyclohexanol, 2-chloro-1,2-dipenylethanol, 2-bromo-1,2-diphenylethanol, 1-chloro-2-methyl-2-propanol, 2-chloro-3-phenyl-1-propanol, 2-chlorocyclopentanol, 2-bromocyclooctanol, 1-bromo-2-hexanol, 2-bromo-1-hexanol, 2-bromoethanol, 2-iodoethanol, 1-bromo-2-propanol, 2-bromo-1-propanol, 2-bromocyclohexanol, 2-bromo-4-tert-butylcyclohexanol, 2-bromo-2-methylcyclohexanol, 2-iodocyclohexanol, 2-chloro-1-octadecanol, 1-chloro-2-octadecanol, 3-chloro-2,3-dimethyl-2-butanol, and the like. Mixtures of the above compounds can be employed if desired and is especially useful when isomeric compounds are employed, e.g., 1-chloro-2-propanol and 2-chloro-1-propanol.

The amines suitable for use in the process of this invention are selected from the group consisting of ammonia and organic amino compounds having from 1 to about 30 carbon atoms and from 1 to about 5 amino groups per molecule, wherein the amino groups can be primary ($-NH_2$), secondary ($>NH$), tertiary

or mixtures thereof. It is preferred that the organic amino compounds used in the practice of this invention contain only carbon, hydrogen and nitrogen; however, substituents which do not interfere with the reaction of carbon dioxide with the above-described halohydrins can be present in the amine compound, as for example, ethereal oxygen.

Examples of suitable amine compounds include ammonia, methylamine, ethylamine, hexylamine, dodecylamine, octadecylamine, octadecylamine, diethylamine, triethylamine, di-n-butylamine, cyclohexylamine, aniline, benzylamine, N-methylaniline, N,N,N',N'-tetramethylethylenediamine, 1,6-diaminohexane, tetraethylenepentamine, and the like.

In a presently preferred embodiment of this invention, the amine is a saturated aliphatic amine having from 1 to 10 carbon atoms per molecule. Examples of presently preferred amine compounds include diethylamine, triethylamine, di-n-butylamine, di-n-pentylamine and the like.

The amount of amine employed in the process of this invention is generally from about 0.1 to about 4 gram equivalents of amino group per gram mol of vicinal halohydrin. It will be appreciated that an amine compound having 1 amino group per molecule has 1 gram equivalent of amino group per gram mol of said compound; an amine compound having 2 amino groups per molecule has 2 gram equivalents of amino group per gram mol of compound, and so forth.

In a presently preferred embodiment the amount of amine compound employed in the process of this invention is in the range of 0.9 to 1.5 gram equivalents of amino group per gram mol of vicinal halohydrin.

Reaction conditions vary according to starting materials. In general, the process is conducted at a temperature which will allow for formation of the cyclic carbonate ester without undesirable side reactions, for a time sufficient to provide essentially complete conversion.

The temperature employed in the process of this invention can be in the range of 0° to 200°C. In a presently preferred embodiment, the temperature is in the range of 40° to 140°C.

Carbon dioxide pressure can be in the range of 0 to 10,000 psig. A pressure in the range of 50 to 500 psig is presently preferred.

The process of this invention can be carried out in the presence or absence of an inert diluent. It is presently preferred that an inert diluent which is a good solvent for carbon dioxide be employed. Examples of suitable diluents include methanol, acetone, toluene, benzene and the like.

The cyclic carbonate ester prepared according to the process of this invention can be recovered from the reaction mixture by conventional methods. The amine hydrohalide salt produced as a coproduct of the reaction is generally insoluble in the reaction mixture; it can be removed by filtration. The filtrate can be fractionally distilled to recover the carbonate ester.

The carbonate esters prepared according to this invention are useful as solvents for a variety of processes, extraction of sulfur compounds from petroleum fractions and the like. These carbonate esters can also be decomposed to produce oxirane compounds having the general formula

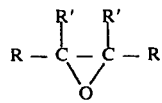

wherein R and R' are as defined hereinbefore. The oxirane compounds are well known in the art as monomers in various types of polymerization systems.

The process of this invention is well adapted for use in a three-step cyclic process for the production of an oxirane compound from an olefin. As a first step, a suitable olefin is reacted with oxygen in the presence of an iron halide to produce a vicinal halohydrin. The coproduct of this reaction is an iron oxide. In the second step, the vicinal halohydrin is then reacted with carbon dioxide in the presence of an amine to provide a cyclic carbonate ester and an amine hydrohalide salt. The iron oxide produced in the first reaction can be reacted with the amine hydrohalide salt to regenerate the iron halide and the amine compound. The latter reaction can be accomplished by admixing the iron oxide and the amine salt, heating the admixture to about 250°C and separately recovering therefrom, by conventional methods, the iron halide and the amine compound. In the third step, the cyclic carbonate ester can be decomposed to produce an oxirane compound and carbon dioxide. The carbon dioxide produced in the third step can be recycled as a reactant to the second step. It will be appreciated that material quantities, reaction conditions and recovery methods are within the skill of one in this art.

The following examples illustrate the invention.

EXAMPLE I

Two runs were carried out in which 25.5 g (0.316 mol) 2-chloro-1-ethanol was reacted with 22 g (0.301 mol) diethylamine and $CO_2$ (400 psig) in the presence of 60 ml benzene. Two different reaction temperatures were employed. The reaction time in each run was 5 hours. Each run was conducted by charging the halohydrin, amine and benzene to an autoclave, stirring and heating to the desired temperature and then charging the carbon dioxide. At the end of the reaction period the reaction mixture was filtered. The recovered solid material was dried and the filtrate was analyzed by gas-liquid chromatography (GLC). Results of the above runs are shown in Table I below.

Table 1

| Run No. | Temp., °C | Halohydrin Conversion, % | Selectivity, % to Carbonate | Amine Salt,[a] g (mol) |
|---|---|---|---|---|
| 1 | 70 | 90 | 90 | 23.9 (0.218) |
| 2 | 90 | 88 | 91 | 25.95 (0.236) |

[a]Diethylamine hydrochloride, filtered from the reaction mixture and dried.

The results shown in Table I show the high degree of conversion of 2-chloro-1-ethanol to ethylene carbonate according to this invention. It can be further seen that about 75 mol percent of the amine compound could be recovered from the mixture as the hydrochloride salt simply by filtering the reaction mixture to recover the solid product.

EXAMPLE II

Two runs were carried out in which diethylamine and a mixture of 1-chloro-2-propanol (78.6%) and 2-chloro-1-propanol (21.4%) were charged to reactors, in amounts given in Table II below. The reactors were charged with carbon dioxide to about 400 psig, then heated to the temperatures given in the following table for the times given. At the end of each reaction period, the reactor was cooled, vented and the contents filtered. The filtrates were analyzed by GLC. The results of these runs are shown in Table II below.

Table II

| Run No. | Halohydrin, g (mol) | $Et_2NH$, g (mol) | Temp. °C. | Time, Hrs. | Halohydrin Conversion, % | Selectivity to Carbonate, % |
|---|---|---|---|---|---|---|
| 3 | 40(0.424) | 30(0.411) | 70 | 2 | 88.6 | 97.3 |
| 4 | 2(0.021) | 1.5(0.021) | 130 | 3 | 91 | 82.9 |

In run 3, analysis of the filtrate further showed that the conversion of 1-chloro-2-propanol was 99% while the conversion of 2-chloro-1-propanol was 50.5% under the reaction conditions given above.

The above results indicate the excellent selective conversion of halohydrin to carbonate esters in the absence of a diluent according to this invention.

EXAMPLE III

Two runs were carried out in which a mixture of 1-chloro-2-propanol (78.6%) and 2-chloro-1-propanol (21.4%) was charged together with triethylamine and benzene to a reaction vessel in amounts shown below. The reactor vessels were pressurized with carbon dioxide as shown in the following table. The reactors were then heated at 70°C for 5 hours. At the end of the reaction period, the reactor was cooled, vented and the contents filtered. The filtrate was analyzed by GLC. Conversion and selectivity data are given in Table III below.

Table III

| Run No. | Halohydrin, g (mol) | $Et_3N$, g (mol) | Benzene, ml. | $CO_2$, psig | Halohydrin Conversion, % | Selectivity to Carbonate, % |
|---|---|---|---|---|---|---|
| 5 | 10(0.106) | 11(0.109) | 20 | 200 | 67.5 | 81 |
| 6 | 29(0.212) | 21.4(0.212) | 40 | 400 | 87 | 95 |

In run 5, the analysis of the filtrate further showed that the conversion of 1-chloro-2-propanol was 83% while the conversion of 2-chloro-1-propanol was only 5.5% under the reaction conditions of this run. In run 6, conversion of 1-chloro-2-propanol was 98% and conversion of the 2-chloro-1-propanol was 43% under the reaction conditions given above.

The above results indicate the excellent conversion and selectivity afforded by the process of this invention and indicate further the differing reactivities of the isomeric halohydrins at different reaction conditions.

EXAMPLE IV

Two runs were carried out in which 10 g (0.106 mol) of a mixture of 1-chloro-2-propanol (78.6%) and 2-chloro-1-propanol (21.4%), 7.82 g (0.107 mol) of diethylamine and 20 ml. of benzene were charged to a 200 ml. aerosol compatibility bottle. The reactors were charged with carbon dioxide to about 100 psig, then immersed in a constant temperature oil bath for 4–5 hours reaction period for each run. At the end of each reaction period, the reactor was cooled, vented and the contents filtered. The solid material, diethylamine hydrochloride, was washed with benzene and dried under vacuum at 100°C overnight. The filtrate was analyzed by GLC. The results of these runs are shown in Table IV below.

Table IV

| Run No. | Temp., °C | Halohydrin Conversion, % | Selectivity to Carbonate, % | Amine Salt g (mol) |
|---|---|---|---|---|
| 7 | 50 | 61.2 | 79 | 6.48 (0.059) |
| 8 | 70 | 74.5 | 86.5 | 7.88 (0.072) |

The above results illustrate the desired conversion with high selectivity of the halohydrin to the carbonate ester at relatively low carbon dioxide pressure and temperature.

EXAMPLE V 6.6 g (0.06 mole) of diethylamine hydrochloride and 1.6 g (0.01 mole) of ferric oxide were ground and charged to a two-neck flask equipped with stirrer and condenser. The mixture was heated to about 235°C for about 2 hours, 2.66 g of the decomposition product, diethylamine, were collected in a dry ice trap.

Reasonable variations and modifications of this invention will be apparent to those skilled in the art in view of this disclosure. Such variations and modifications are within the scope and spirit of the disclosure.

What is claimed is:

1. A process for the preparation of an oxirane compound from the corresponding olefin which comprises the steps of:

a. forming a vicinal halohydrin having from 2 to 30 carbon atoms per molecule of the formula

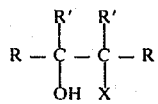

wherein each R and R' is individually selected from the group consisting of hydrogen and hydrocarbyl radical groups having from 1 to 10 carbon atoms and wherein both R' groups in said halohydrin can represent a divalent aliphatic hydrocarbon radical which together with the carbon atoms to which the —X and the —OH groups are attached can form a cycloaliphatic ring, and X is selected from the group consisting of chlorine, bromine and iodine, by reacting the corresponding olefin of the formula

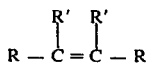

wherein R and R' are as defined above, with oxygen in the presence of an iron halide and a copper halide, under reaction conditions, wherein there is formed as a coproduct, an iron oxide;

b. separately recovering from step (a), said vicinal halohydrin and said iron oxide;

c. reacting said vicinal halohydrin, an amine and carbon dioxide, under reaction conditions, to form a cyclic carbonate ester having from 3 to 31 carbon atoms per molecule of the formula

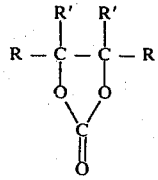

wherein R and R' are as defined above, wherein there is formed as a coproduct an amine hydrohalide;

d. separately recovering from step (c) said ester and said amine hydrohalide;

e. decomposing said ester to form the corresponding oxirane compound and carbon dioxide; and f. separately recovering from step (e) said carbon dioxide and said oxirane compound as a product of the process.

2. The process of claim 1 wherein said iron oxide from step (b) is reacted with said amine hydrohalide from step (d) to regenerate said iron halide and said amine.

3. The process of claim 2 wherein said iron halide is passed to the process of claim 2, step (a).

4. The process of claim 2 wherein said amine is passed to the process of claim 2, step (c).

5. The process of claim 1 wherein said carbon dioxide recovered in step (f) is passed to step (c).

6. The process of claim 1 wherein said amine is selected from the group consisting of ammonia and organic amino compounds having from 1 to 30 carbon atoms and from 1 to 5 amino groups per molecule.

7. The process of claim 6 wherein said amine is a saturated aliphatic amine having from 1 to 10 carbon atoms per molecule.

8. The process of claim 1 wherein said amine is employed in step (c) in an amount ranging from about 0.9 to about 1.5 gram equivalents of amino group per gram mol of said vicinal halohydrin.

9. The process of claim 1 wherein said olefin is propylene and said oxirane is propylene oxide.

* * * * *

UNITED STATES PATENT AND TRADEMARK OFFICE
CERTIFICATE OF CORRECTION

PATENT NO. : 3,923,842
DATED : December 2, 1975
INVENTOR(S) : Yulin Wu

It is certified that error appears in the above-identified patent and that said Letters Patent are hereby corrected as shown below:

Column 7, line 11, claim 3, "claim 2" should be --- claim 1 ---.

Signed and Sealed this sixth Day of April 1976

[SEAL]

Attest:

RUTH C. MASON
*Attesting Officer*

C. MARSHALL DANN
*Commissioner of Patents and Trademarks*